United States Patent
Shimasaki et al.

(10) Patent No.: US 12,202,421 B2
(45) Date of Patent: Jan. 21, 2025

(54) LOWER BUMPER REINFORCEMENT AND VEHICLE

(71) Applicants: TOYOTA JIDOSHA KABUSHIKI KAISHA, Aichi (JP); SUBARU CORPORATION, Tokyo (JP)

(72) Inventors: Osamu Shimasaki, Nisshin (JP); Satoshi Ikeda, Tokyo (JP); Naoki Tsukahara, Tokyo (JP); Shinji Nakano, Tokyo (JP)

(73) Assignees: TOYOTA JIDOSHA KABUSHIKI KAISHA, Aichi (JP); SUBARU CORPORATION, Tokyo (JP)

( * ) Notice: Subject to any disclaimer, the term of this patent is extended or adjusted under 35 U.S.C. 154(b) by 284 days.

(21) Appl. No.: 17/890,268

(22) Filed: Aug. 18, 2022

(65) Prior Publication Data
US 2023/0083528 A1  Mar. 16, 2023

(30) Foreign Application Priority Data
Sep. 15, 2021 (JP) .................. 2021-150391

(51) Int. Cl.
*B60R 19/34* (2006.01)
*B60R 19/24* (2006.01)
*B60R 19/44* (2006.01)
*B62D 21/15* (2006.01)

(52) U.S. Cl.
CPC ............ *B60R 19/34* (2013.01); *B60R 19/24* (2013.01); *B60R 19/44* (2013.01); *B62D 21/152* (2013.01)

(58) Field of Classification Search
CPC . B60R 19/44; B60R 19/34; B60R 2019/1886; B60R 19/24; B62D 21/152
See application file for complete search history.

(56) References Cited

U.S. PATENT DOCUMENTS

| | | | |
|---|---|---|---|
| 9,440,607 B1* | 9/2016 | Harris | B60R 19/16 |
| 2005/0067860 A1* | 3/2005 | Makita | B60R 19/34 |
| | | | 296/203.02 |
| 2006/0284432 A1* | 12/2006 | Hashimoto | B21D 39/06 |
| | | | 293/154 |
| 2013/0257070 A1 | 10/2013 | Ebara et al. | |
| 2020/0156574 A1* | 5/2020 | Mitsuya | B62D 25/084 |

FOREIGN PATENT DOCUMENTS

| | | | | |
|---|---|---|---|---|
| JP | 2007-261525 A | | 10/2007 | |
| JP | 2010042783 A | * | 2/2010 | ............ B60R 19/18 |
| JP | 2010100259 A | | 5/2010 | |
| JP | 2013-203304 A | | 10/2013 | |
| JP | 201794972 A | | 6/2017 | |

* cited by examiner

*Primary Examiner* — Daniel J Colilla
(74) *Attorney, Agent, or Firm* — HAUPTMAN HAM, LLP (57) ABSTRACT

A vehicle includes a body. The vehicle includes a front bumper reinforcement that is attached to a front end of the body, and extends along a vehicle width direction. The vehicle includes a lower bumper reinforcement that is attached to the front end of the body, is located under the front bumper reinforcement, and extends along the vehicle width direction. The vehicle includes at least one specific member that is fixed to a partial section of the lower bumper reinforcement along an extending direction of the lower bumper reinforcement. Each of the at least one specific member includes a first portion that covers a front face of the lower bumper reinforcement, and a second portion that protrudes more upward than an upper face of the lower bumper reinforcement.

7 Claims, 7 Drawing Sheets

LOWER BUMPER REINFORCEMENT AND VEHICLE

CROSS-REFERENCE TO RELATED APPLICATION

This application claims priority to Japanese Patent Application No. 2021-150391 filed on Sep. 15, 2021, incorporated herein by reference in its entirety.

BACKGROUND

1. Technical Field

The technology disclosed in the present specification relates to a lower bumper reinforcement and a vehicle. More particularly, the technology disclosed in the present specification relates to a structure having a lower bumper reinforcement.

2. Description of Related Art

Japanese Unexamined Patent Application Publication No. 2017-94972 (JP 2017-94972 A) describes a vehicle equipped with a lower bumper reinforcement. When a vehicle collides with various kinds of barriers, such as a collision testing barrier, the lower bumper reinforcement can bear the collision load.

SUMMARY

The lower the position of the lower bumper reinforcement is set, the smaller the amount of overlap from a lower end of the lower bumper reinforcement to a lower end of the barrier is. That is to say, an up-down direction distance between the lower bumper reinforcement and space under the barrier is shortened. When this configuration collides with the barrier, the lower bumper reinforcement may be displaced into the space under the barrier. In this case, it is difficult for lower bumper reinforcement to appropriately bearing the collision load.

A vehicle according to a first aspect of the disclosure includes a body. The vehicle includes a front bumper reinforcement that is attached to a front end of the body, and extends along a vehicle width direction. The vehicle includes a lower bumper reinforcement that is attached to the front end of the body, is located under the front bumper reinforcement, and extends along the vehicle width direction. The vehicle includes at least one specific member that is fixed to a partial section of the lower bumper reinforcement along an extending direction of the lower bumper reinforcement. Each of the at least one specific member includes a first portion that covers a front face of the lower bumper reinforcement, and a second portion that protrudes more upward than an upper face of the lower bumper reinforcement.

The present inventors have found that the phenomenon of the lower bumper reinforcement being displaced to a space below the barrier can occur when a pressure receiving area (the area of the region for bearing the collision load) of the lower bumper reinforcement is small. One of the factors thereof that can be given is that a concentrated load is input to the lower bumper reinforcement, and accordingly, local deformation in which the lower bumper reinforcement is moved downward occurs more readily. Accordingly, in the vehicle described above, the pressure receiving area for receiving the collision load can be increased by the second portion. The collision load input to the lower bumper reinforcement is less readily concentrated, and accordingly occurrence of local deformation in which the lower bumper reinforcement is moved downward can be suppressed. This enables suppressing the phenomenon in which the lower bumper reinforcement is displaced to a space below the barrier. Also, the first portion covers the front face of the lower bumper reinforcement, and accordingly the collision load borne by the second portion can be conveyed to the lower bumper reinforcement via the first portion. Thus, the lower bumper reinforcement can appropriately bear the collision load.

In the vehicle according to the above aspect, a length of each of the at least one specific member in an up-down direction may be greater than a length of the lower bumper reinforcement in the up-down direction. Accordingly, a sufficient amount of protrusion of the second portion protruding upward from the upper face of the lower bumper reinforcement can be secured.

In the vehicle according to the above aspect, each of the at least one specific member may further include a protrusion that projects rearward from the second portion and that is in contact with the upper face of the lower bumper reinforcement. The protrusion can suppress deformation of the second portion to the rearward side. Accordingly, the collision load input to the second portion can be appropriately borne.

The vehicle according to the above aspect may further include a pair of crash boxes extending along a vehicle front-rear direction. Rear end portions of the crash boxes may be connected to a lower portion of the body. Front end portions of the crash boxes may be connected to the lower bumper reinforcement. At least a part of the first portion may overlap the front end portion of a corresponding one of the crash boxes, as viewed from the front of the vehicle. Accordingly, an impact load input to the first portion can be directly conveyed to the crash boxes. This enables the impact load to be efficiently conveyed to the crash boxes.

In the vehicle according to the above aspect, the first portion may be located inward in the vehicle width direction with respect to an outer-side sidewall at an outer side of the corresponding one of the crash boxes in the vehicle width direction, as viewed from the front of the vehicle. A region where the first portion is not disposed can be formed at the front end portion of the crash boxes.

In the vehicle according to the above aspect, a part of the first portion may be located inward in the vehicle width direction with respect to an inner-side sidewall at an inner side of the corresponding one of the crash boxes in the vehicle width direction, as viewed from the front of the vehicle. This allows the first portion to overlap the inner-side sidewall of the crash boxes. This enables the impact load to be efficiently conveyed to the inner-side sidewall of the crash boxes.

The vehicle according to the above aspect may further include fixing members that fix the lower bumper reinforcement to the crash boxes. Each of the fixing members may be located inward in the vehicle width direction with respect to the outer-side sidewall of the corresponding one of the crash boxes, and outward in the vehicle width direction with respect to an end face at an outer side of the first portion in the vehicle width direction, as viewed from the front of the vehicle. Accordingly, the fixing member can be disposed at the front end portions of the crash boxes, in a region where the first portion is not disposed. This can suppress interference between the fixing member and the first portion from occurring when attaching the fixing member.

In the vehicle according to the above aspect, the body may include a subframe disposed at the lower portion of the body. The crash boxes may be connected to a front end portion of the subframe. Thus, the impact load can be conveyed to the subframe via the crash boxes. Deformation of the subframe enables the impact load to be absorbed.

The vehicle according to the above aspect may further include a grille shutter disposed above the lower bumper reinforcement. The grille shutter may be located inward in the vehicle width direction with respect to an end face at the inner side of the second portion in the vehicle width direction, as viewed from the front of the vehicle.

Accordingly, the second portion and the grille shutter do not interfere with each other. Space for disposing the grille shutter can be secured.

In the vehicle according to the above aspect, a strength of a material of the at least one specific member may be weaker than a strength of a material of the lower bumper reinforcement. Thus, the specific member can be deformed more readily than the lower bumper reinforcement. This enables suppression of the load being concentrated on the specific member when colliding with the barrier.

In the vehicle according to the above aspect, the at least one specific member and the front face of the lower bumper reinforcement may be spaced from each other. A second aspect of the disclosure relates to a lower bumper reinforcement for a vehicle. The lower bumper reinforcement includes at least one specific member that is fixed to a partial section of the lower bumper reinforcement along an extending direction of the lower bumper reinforcement. Each of the at least one specific member includes a first portion that covers a front face of the lower bumper reinforcement, and a second portion that protrudes more upward than an upper face of the lower bumper reinforcement.

In the lower bumper reinforcement according to the above aspect, the lower bumper reinforcement may be configured to be located under a front bumper reinforcement of the vehicle.

In the lower bumper reinforcement according to the above aspect, a length of each of the at least one specific member in an up-down direction may be greater than a length of the lower bumper reinforcement in the up-down direction.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Vehicle Front Structure

Figure 1:
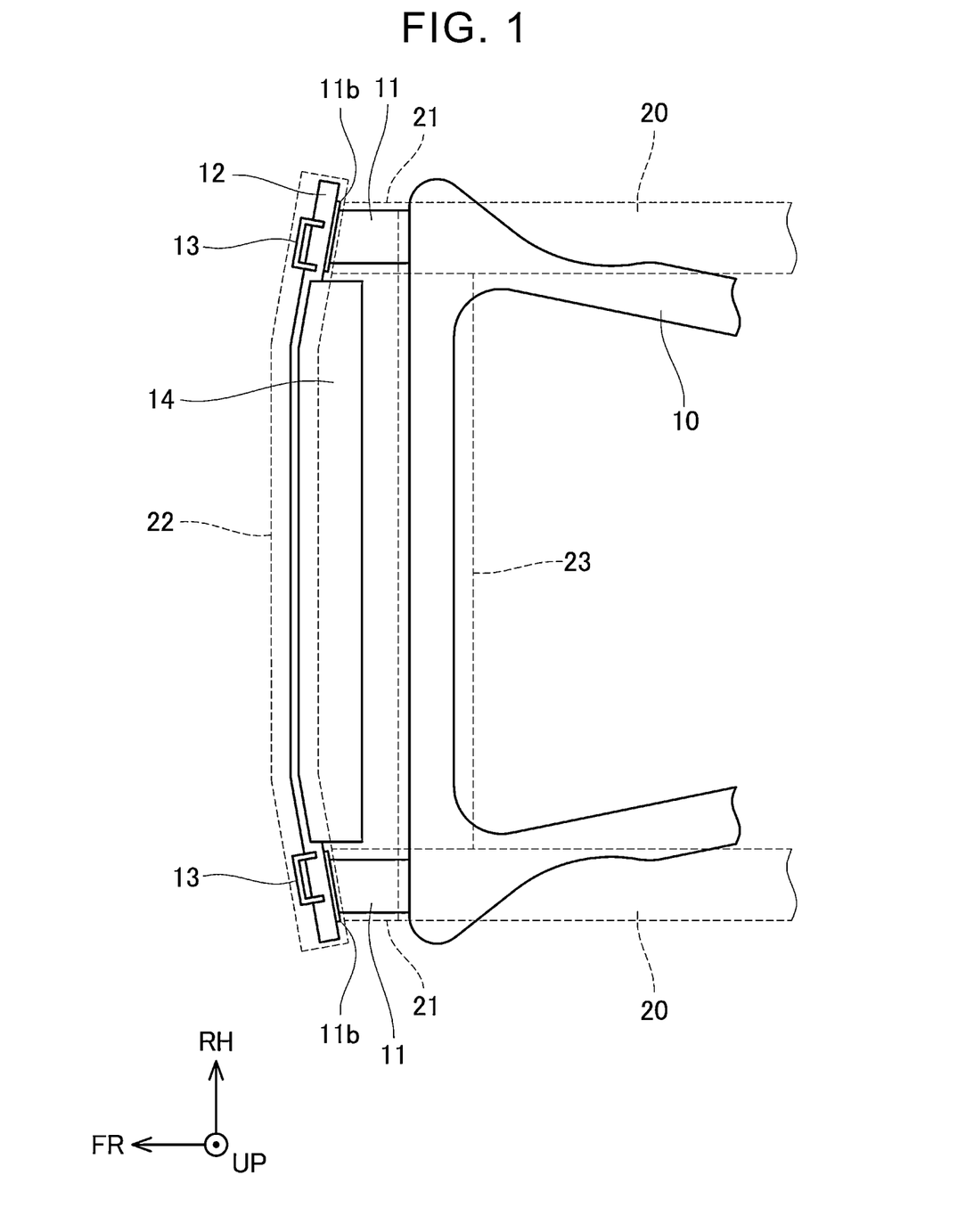
FIG. 1 is a top view of a vehicle front structure.

FIG. 1 illustrates a top view of a vehicle front structure according to an embodiment. Here, a direction FR in the drawings indicates forward in a vehicle front-rear direction, and a direction RR indicates rearward in the vehicle front-rear direction. Also, a direction LH indicates leftward in a right-left direction (or width direction) of the vehicle, and a direction RH indicates rightward in the right-left direction of the vehicle. Further, a direction UP indicates upward in an up-down direction of the vehicle, and a direction DW indicates downward in the up-down direction of the vehicle. Moreover, the directions described in the specification, such as for example, "front-rear direction", "right-left direction", "up-down direction", "forward", "rearward", "leftward", "rightward", "upward", "downward", and so forth, indicate these directions in the vehicle, respectively. The meanings of the axes in the coordinate system are the same in the following drawings as well. The vehicle of the present embodiment has a symmetrical shape, and accordingly, hereinafter only one side of the vehicle may be described in some cases.

The vehicle includes a subframe 10, crash boxes 11, a lower bumper reinforcement 12, specific members 13, and a grille shutter 14. Also, on the upward side thereof are provided front side members 20, crash boxes 21, a front bumper reinforcement 22, and a cross member 23. For the sake of ease of viewing the drawings, the front side members 20, the crash boxes 21, the front bumper reinforcement 22, and the cross member 23 are indicated by dotted lines. The subframe 10, the front side members 20, and the cross member 23 are members making up a body. Note that in FIG. 1, illustration of other members is omitted.

The front side members 20 are members forming a framework of a front portion of the body. A pair of right and left front side members 20 extends in the vehicle front-rear direction, and the right and left front side members 20 are respectively disposed on right and left sides in the vehicle width direction. The cross member 23 connects front ends of the front side members 20 in the vehicle width direction. A pair of the crash boxes 21 is attached to the front ends of the front side members 20. The front bumper reinforcement 22 is bridged over front end portions of the crash boxes 21. That is to say, the front bumper reinforcement 22 is attached to a front end of the body and extends along the vehicle width direction.

The subframe 10 is a structure mainly for supporting a suspension (a suspension arm in particular) in a vehicle such as an automobile that travels over a road surface. The subframe 10 is also referred to as a suspension member. The subframe 10 is disposed at a lower portion of the body. Specifically, the subframe 10 is attached to lower faces of the front side members 20.

A pair of the crash boxes 11 extends along the vehicle front-rear direction. The crash boxes 11 each have a closed cross-sectional structure of which a cross-sectional shape is substantially rectangular. Rear end portions of the crash boxes 11 are attached to a front end portion of the subframe 10 and thus are connected to the lower portion of the body. Front end portions of the crash boxes 11 are connected to the lower bumper reinforcement 12 via brackets 11b. The crash boxes 11 are parts that are configured to exhibit compression deformation in an axial direction under a load input of a predetermined value or more from the lower bumper reinforcement 12.

The lower bumper reinforcement 12 is bridged over the front end portions of the crash boxes 21. That is to say, the lower bumper reinforcement 12 is attached to the front end of the body and extends along the vehicle width direction.

Also, the lower bumper reinforcement 12 is located under the front bumper reinforcement 22. A cross section of the lower bumper reinforcement 12 orthogonal to the vehicle width direction is a closed cross section.

A pair of the specific members 13 is fixed to partial sections of the lower bumper reinforcement 12 along the extending direction of the lower bumper reinforcement 12. A detailed structure of the specific members 13 will be described later.

The grille shutter 14 is a device that controls traveling wind delivered to a radiator that is omitted from illustration, in accordance with driving conditions, by opening and closing a shutter. The grille shutter 14 is disposed above the lower bumper reinforcement 12, and on the below the front bumper reinforcement 22.

Structure of Specific Member 13

Figure 2:
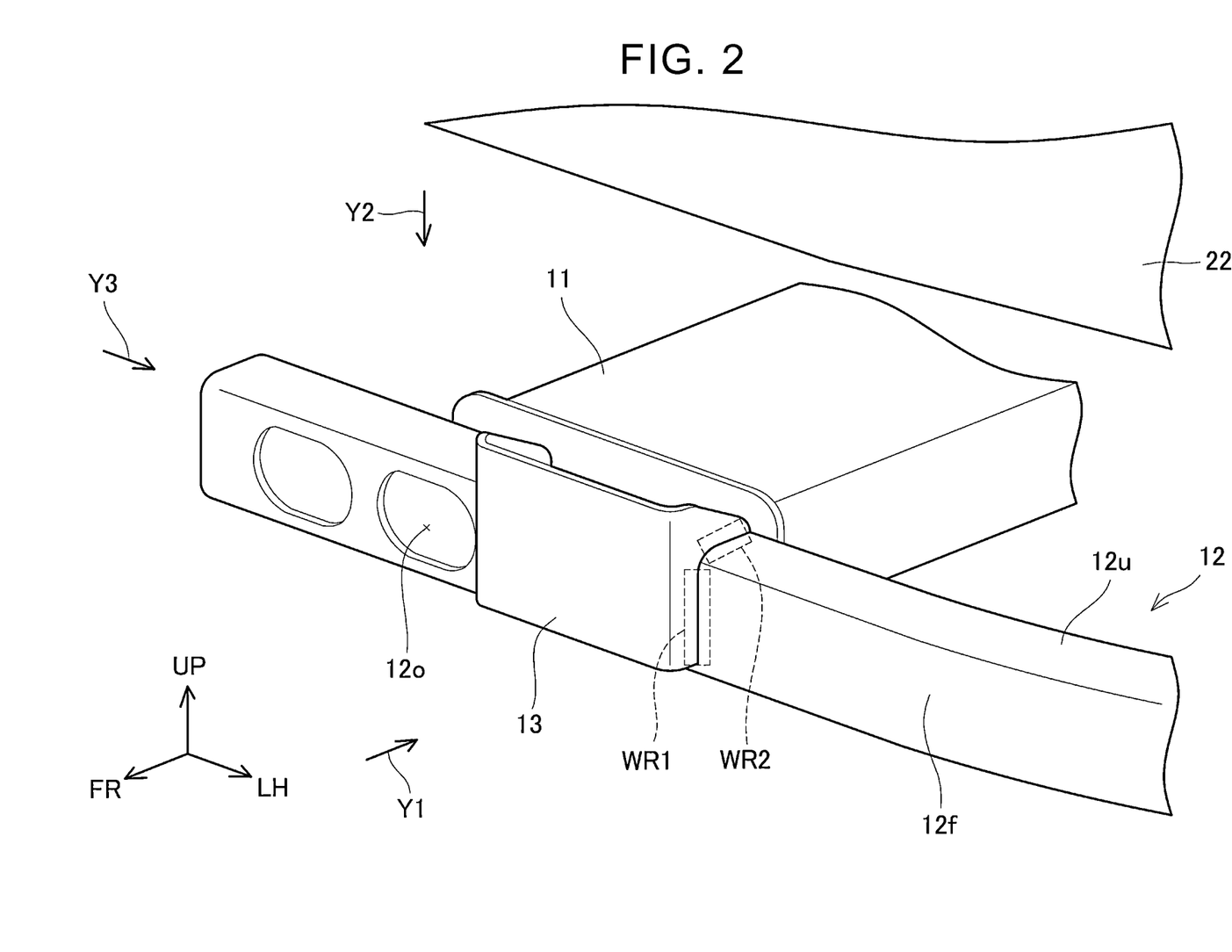
FIG. 2 is a perspective view of a vicinity of a specific member 13.
Figure 3:
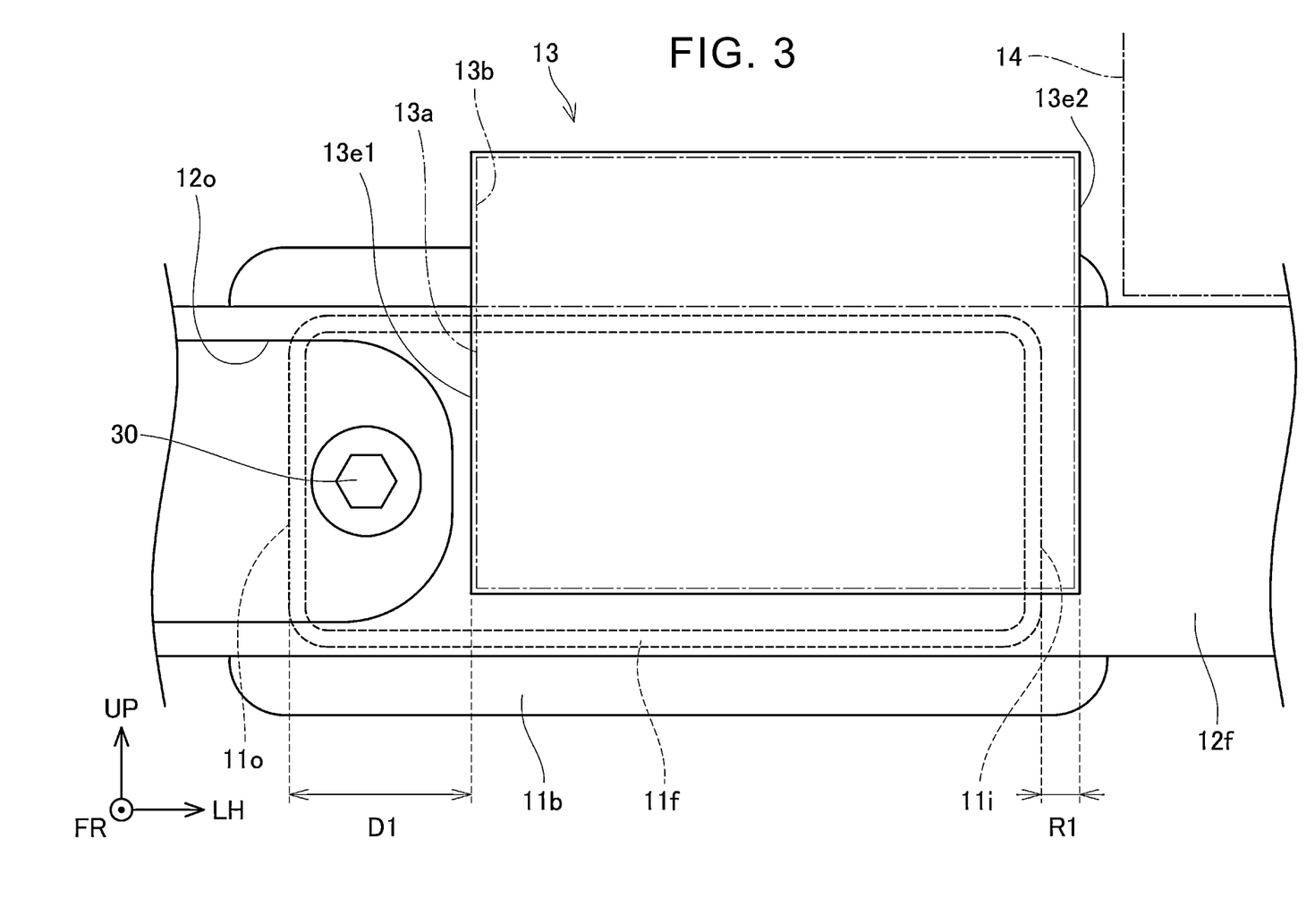
FIG. 3 is a front view as viewed from a direction of an arrow Y1 in FIG. 2.
Figure 4:
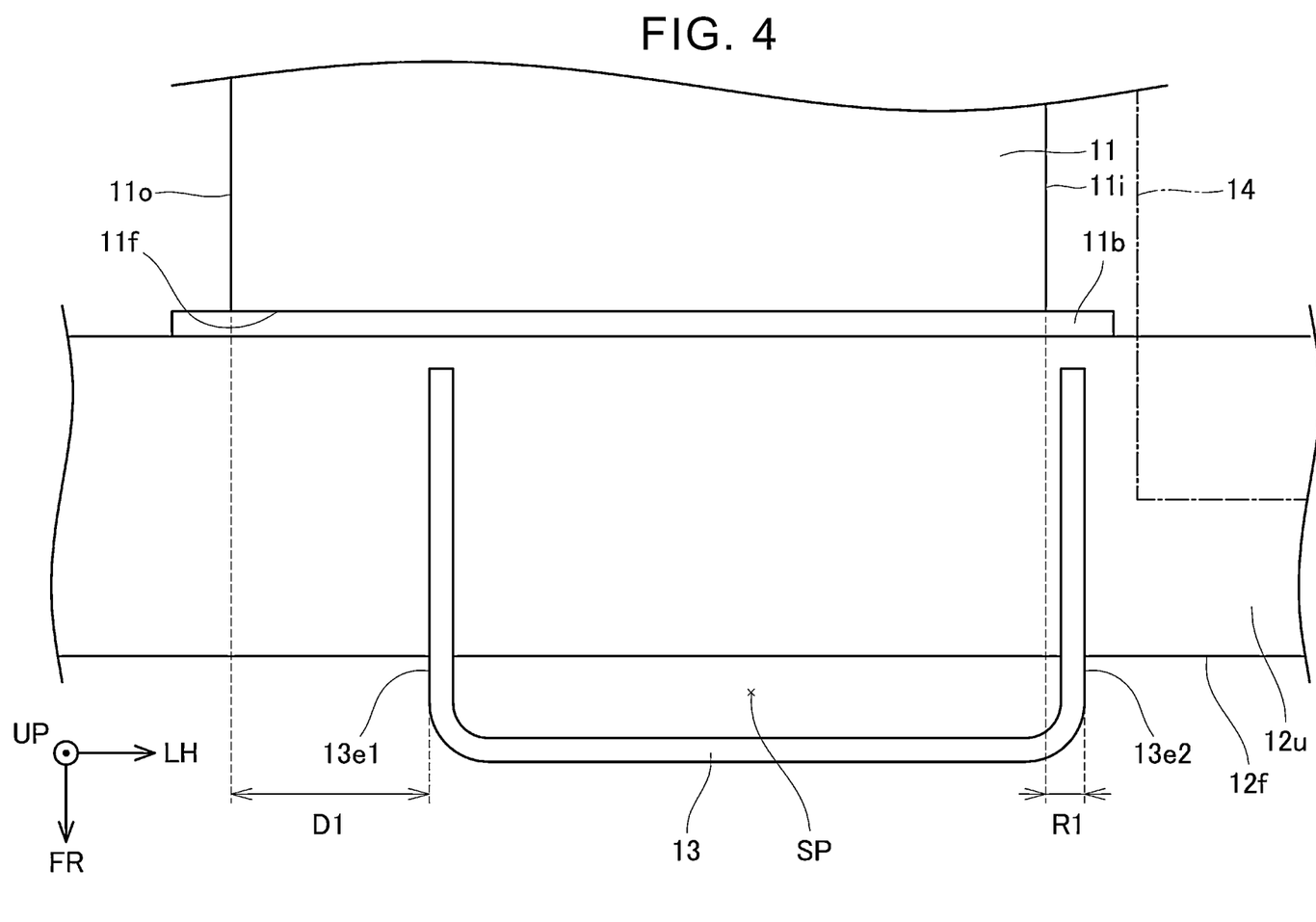
FIG. 4 is a top view as viewed from a direction of an arrow Y2 in FIG. 2.
Figure 5:
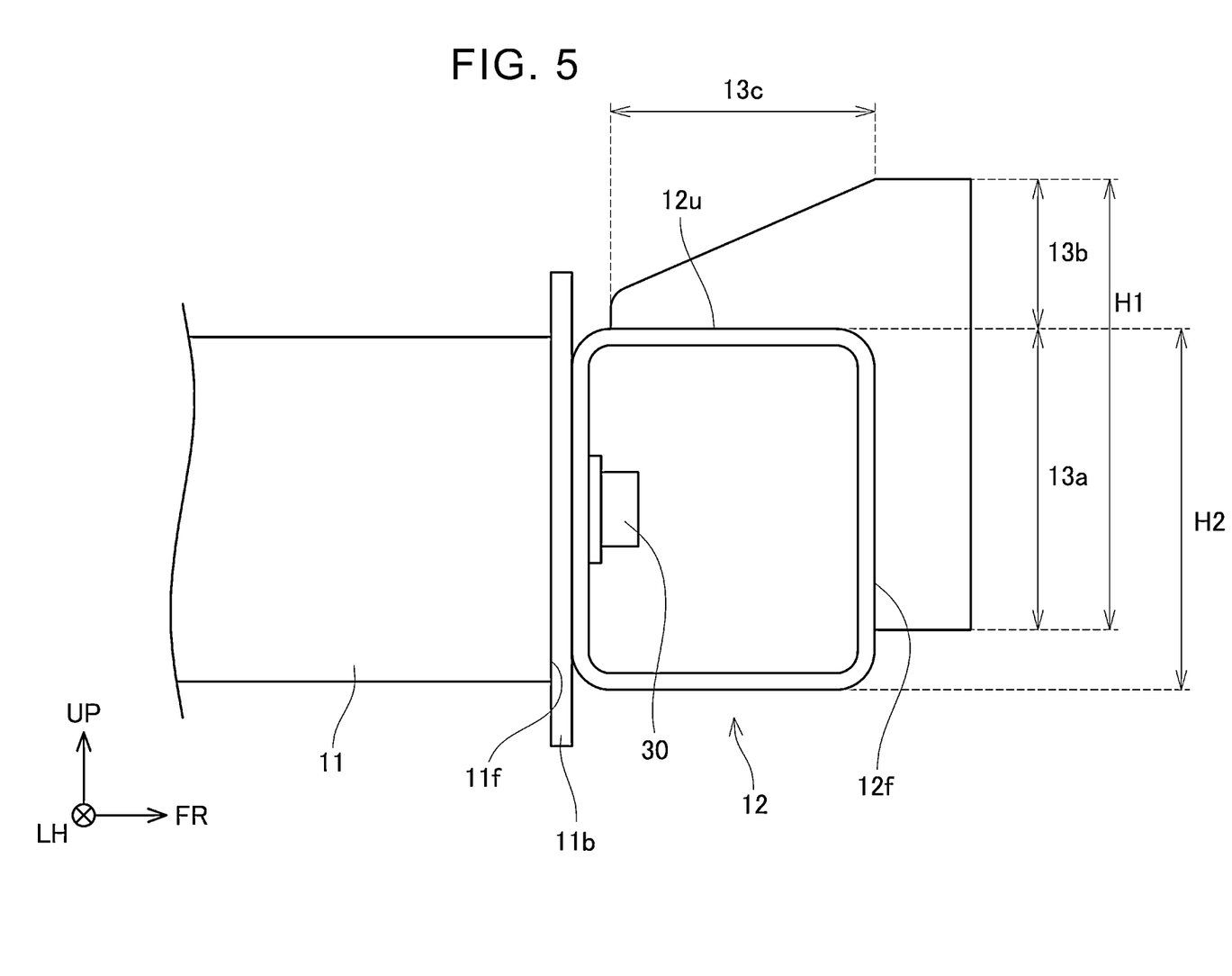
FIG. 5 is a side view as viewed from a direction of an arrow Y3 in FIG. 2.

The structure of the specific member 13 will be described with reference to FIGS. 2 to 5. FIG. 2 is a perspective view of a vicinity of the specific member 13 disposed on the right side of the vehicle. In FIG. 2, the subframe 10, the grille shutter 14, and the rear-side portions of the crash boxes 11 are omitted from illustration. FIG. 3 is a front view as viewed from a direction of an arrow Y1 in FIG. 2 (i.e., as viewed from the front of the vehicle). FIG. 4 is a top view as viewed from a direction of an arrow Y2 in FIG. 2. FIG. 5 is a side view as viewed from a direction of an arrow Y3 in FIG. 2. In FIGS. 3 and 4, the position at which the grille shutter 14 is disposed is indicated by a long dashed short dashed line.

The specific member 13 is a member formed by bending a steel plate. As illustrated in FIG. 2, the specific member 13 is fixed to the lower bumper reinforcement 12 by welding regions WR1 and WR2. The welding region WR1 is a region in which a contact portion between the specific member 13 and a front face 12f of the lower bumper reinforcement 12 is arc-welded. The welding region WR2 is a region in which a contact portion between the specific member 13 and an upper face 12u of the lower bumper reinforcement 12 is arc-welded. The strength of the material of the specific member 13 is made to be weaker than the strength of the material of the lower bumper reinforcement 12.

The specific member 13 includes a first portion 13a, a second portion 13b, and a protrusion 13c (see FIGS. 3 and 5). The first portion 13a is a portion that covers the front face 12f of the lower bumper reinforcement 12. The second portion 13b is a portion protruding more upward than the upper face 12u of the lower bumper reinforcement 12. The protrusion 13c is a portion that protrudes rearward from the second portion 13b and is in contact with the upper face 12u of the lower bumper reinforcement 12. The protrusion 13c is formed of a steel plate that is bent so as to be substantially perpendicular to the second portion 13b. The protrusion 13c functions as a reinforcing member for suppressing deformation of the second portion 13b to the rearward side. Accordingly, a collision load input to the second portion 13b can be appropriately borne.

As illustrated in FIG. 5, a length H1 of the specific member 13 in the up-down direction is greater than a length H2 of the lower bumper reinforcement 12 in the up-down direction. Accordingly, a sufficient amount of protrusion of the second portion 13b protruding upward from the upper face 12u of the lower bumper reinforcement 12 can be secured.

In FIG. 3, a front end portion 11f of the crash box 11 that has a substantially rectangular closed cross-sectional structure is indicated by a dotted line. As viewed from the front of the vehicle, at least part of the first portion 13a of the specific member 13 overlaps the front end portion 11f of the crash box 11. Accordingly, an impact load input to the first portion 13a can be directly conveyed to the crash box 11. This enables the impact load to be efficiently conveyed to the crash box 11.

As illustrated in FIGS. 3 and 4, the crash box 11 has an outer-side sidewall 11o located at an outer side in the vehicle width direction (i.e., to the left side in FIGS. 3 and 4) and an inner-side sidewall 11i located at an inner side in the vehicle width direction (i.e., to the right side in FIGS. 3 and 4). Also, an end face 13e1 is located outward in the vehicle width direction with respect to the first portion 13a. The end face 13e1 is located inward in the vehicle width direction with respect to the outer-side sidewall 11o of the crash box 11, by a distance D1. Accordingly, a region in which the first portion 13a is not disposed at the front end portion 11f of the crash box 11, as viewed from the front of the vehicle, can be formed.

Further, an opening 120 formed in the front face 12f of the lower bumper reinforcement 12 is located in the region where the first portion 13a is not disposed. A bolt 30 for fixing the lower bumper reinforcement 12 to the crash box 11 is disposed inside the opening 120. The bolt 30 is located inward in the vehicle width direction with respect to the outer-side sidewall 11o of the crash box 11, and outward in the vehicle width direction with respect to the end face 13e1 of the first portion 13a, as viewed from the front of the vehicle. Accordingly, the bolt 30 can be disposed at the front end portion 11f of the crash box 11, in a region where the first portion 13a of the specific member 13 is not disposed. This can suppress interference between the bolt 30 and the first portion 13a from occurring when attaching the bolt 30 via the opening 120.

As illustrated in FIGS. 3 and 4, a partial region R1 of the first portion 13a is located inward in the vehicle width direction (i.e., on the right side in FIGS. 3 and 4) with respect to the inner-side sidewall 11i of the crash box 11. Accordingly, the first portion 13a and the inner-side sidewall 11i of the crash box 11 can be made to overlap as viewed from the front of the vehicle. This enables the impact load to be efficiently conveyed to the inner-side sidewall 11i of the crash box 11.

As illustrated in FIG. 4, a space SP is formed between the specific member 13 and the front face 12f of the lower bumper reinforcement 12. In other words, the specific member 13 and the front face 12f of the lower bumper reinforcement 12 are spaced from each other. This enables arc welding to be appropriately performed at the welding region WR1 (see FIG. 2). Further, the space SP can be made to function as a crushable zone.

As illustrated in FIGS. 3 and 4, an end face 13e2 is located on the inner side of the second portion 13b in the vehicle width direction. The grille shutter 14 indicated by the long dashed short dashed line is located inward in the vehicle width direction with respect to the end face 13e2, as viewed from the front of the vehicle. Accordingly, the second portion 13b of the specific member 13 and the grille shutter 14 do not interfere with each other. This enables space for disposing the grille shutter 14 to be secured.

The lower bumper reinforcement 12 is required to be designed so as not to apply a concentrated load to a barrier when colliding with the barrier. In the technology of the present specification, the strength of the material of the specific member 13 is made to be weaker than the strength of the material of the lower bumper reinforcement 12. Thus, the specific member 13 can be deformed more readily than the lower bumper reinforcement 12. This enables suppressing a concentrated load from being applied to the barrier by the specific member 13.

Effects

Figure 6:
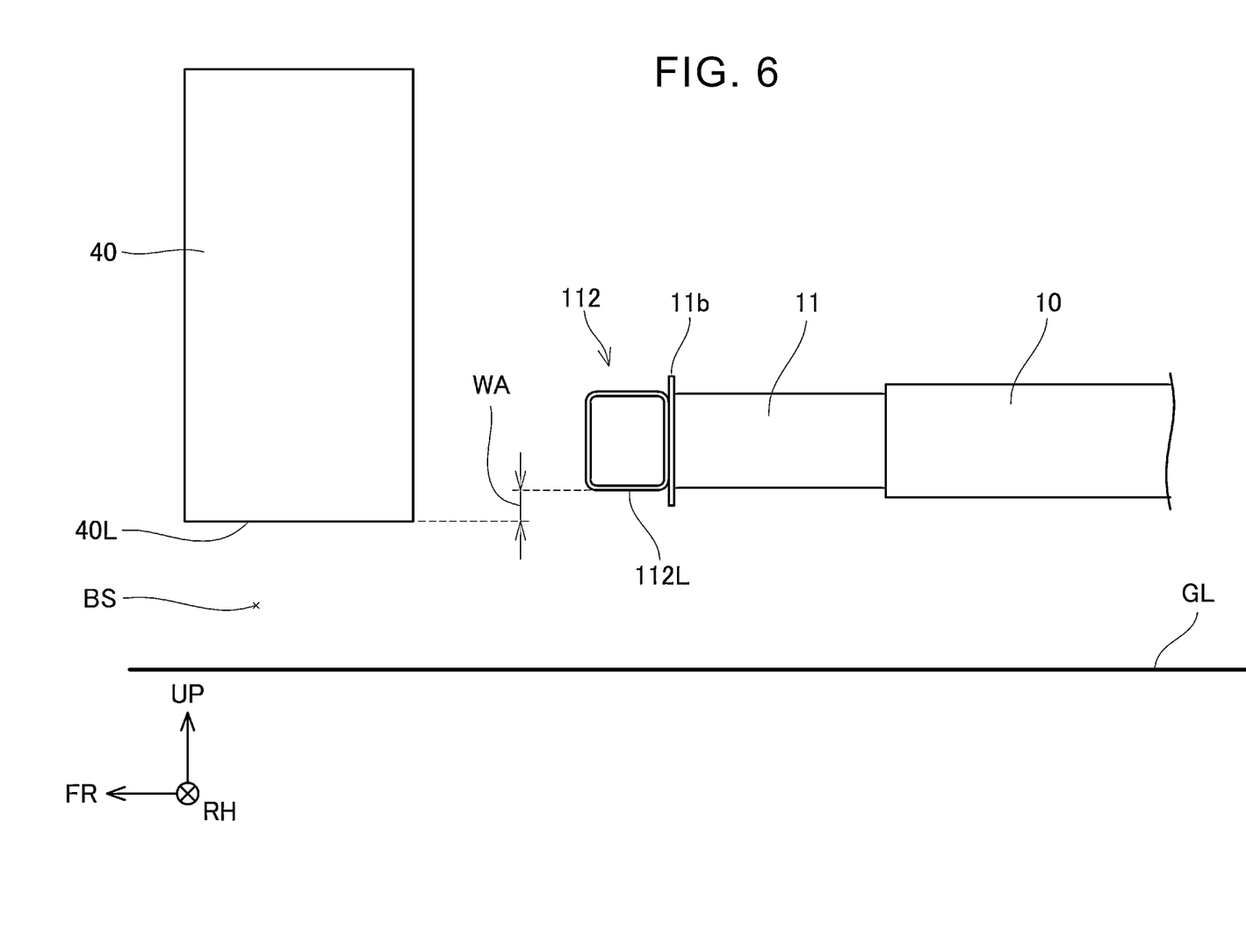
FIG. 6 is a side view illustrating a state prior to a collision of a lower bumper reinforcement 112 according to the related art.
Figure 7:
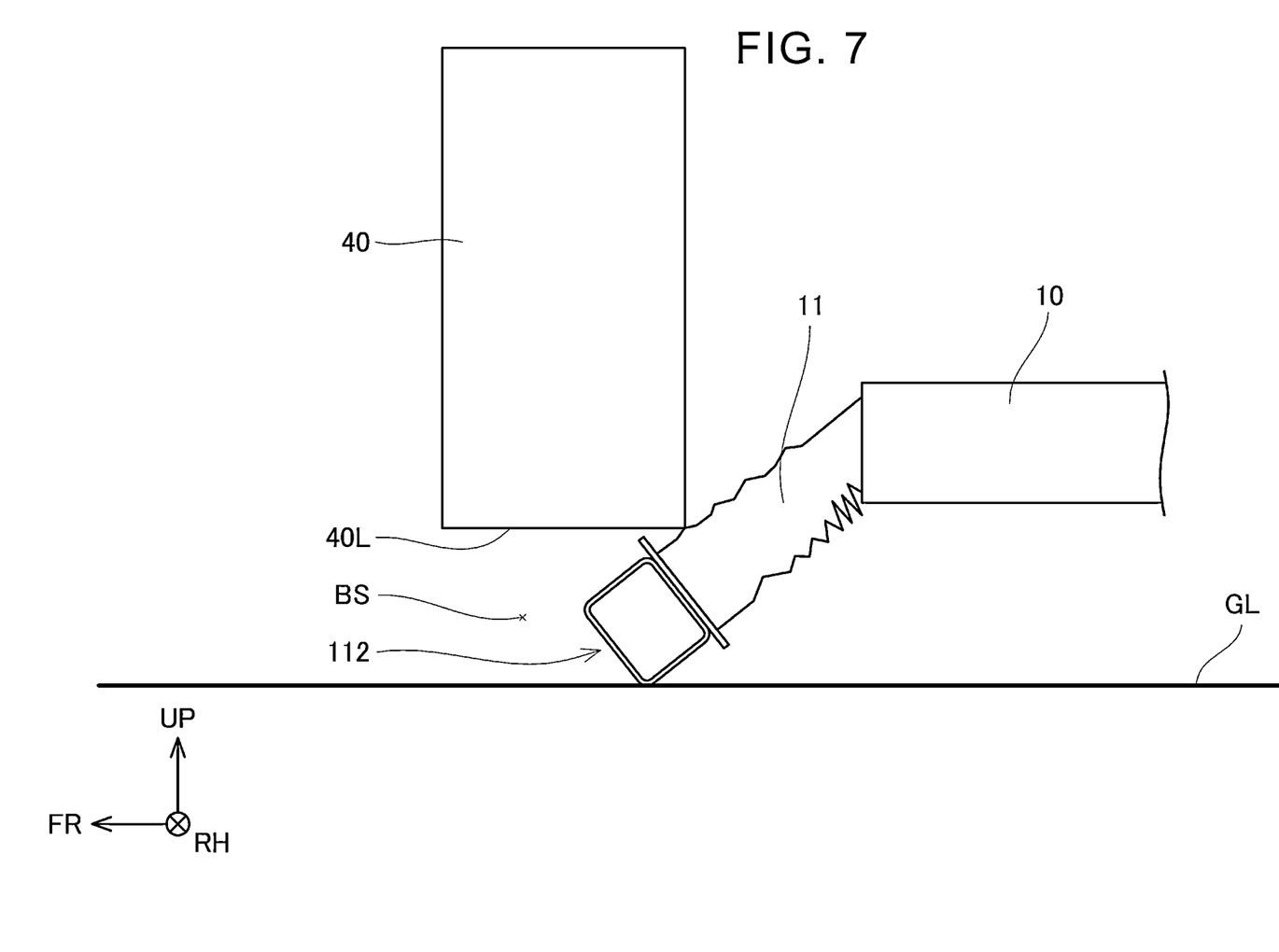
FIG. 7 is a side view illustrating a state following collision of the lower bumper reinforcement 112 according to the related art.

A problem will be described with reference to side views in FIGS. 6 and 7. FIGS. 6 and 7 illustrate a lower bumper reinforcement 112 according to the related art that does not include the specific member 13. FIG. 6 illustrates a state before a collision, and FIG. 7 illustrates a state after the collision. In FIGS. 6 and 7, only the lower bumper reinforcement 112, the crash box 11, the subframe 10, and a barrier 40 are illustrated, to facilitate understanding. As illustrated in FIG. 6, an overlap amount WA exists from a lower end 112L of the lower bumper reinforcement 112 to a lower end 40L of the barrier 40. The lower the position of the lower bumper reinforcement 112 is set to be with respect to a ground line GL, the smaller the overlap amount WA becomes. That is to say, the up-down direction distance between the lower end 112L of the lower bumper reinforcement 112 and the lower end 40L of the barrier 40 is shortened. When this configuration collides with the barrier 40, the lower bumper reinforcement 112 may be displaced into a space BS below the barrier 40 in some cases, as illustrated in FIG. 7. In such cases, it is difficult for the lower bumper reinforcement 112 to appropriately bear the collision load. Accordingly, the subframe 10 may not be sufficiently deformed, and the subframe 10 may not sufficiently absorb the collision load. The present inventors have found that the phenomenon of the lower bumper reinforcement 112 being displaced to a position below the barrier 40 can occur when a pressure receiving area (the area of the region for bearing the collision load) of the lower bumper reinforcement 112 is small. One of the factors thereof that can be given is that a concentrated load is input to the lower bumper reinforcement 112, and accordingly local deformation in which the lower bumper reinforcement 112 is moved downward occurs more readily.

Accordingly, in the technology according to the present specification, the specific member 13 is disposed on the lower bumper reinforcement 12. The second portion 13b that the specific member 13 includes can increase the pressure receiving area for receiving the collision load (see FIG. 3). The collision load input to the lower bumper reinforcement 12 is less readily concentrated, and accordingly occurrence of local deformation in which the lower bumper reinforcement 12 is moved downward can be suppressed. Even in a state in which the overlap amount WA is small, the phenomenon in which the lower bumper reinforcement 12 is displaced to a position below the barrier 40 can be stably suppressed. Also, the first portion 13a covers the front face 12f of the lower bumper reinforcement 12, and accordingly the collision load borne by the second portion 13b can be conveyed to the lower bumper reinforcement 12 via the first portion 13a. Thus, the lower bumper reinforcement 12 can appropriately bear the collision load. As a result, the impact load can be conveyed to the subframe 10 via the crash box 11. Sufficient deformation of the subframe 10 allows the collision load to be absorbed.

Increasing the height of the lower bumper reinforcement over the entirety of the extending direction, in order to increase the pressure receiving area, is conceivable. However, when doing so, an increase in mass is brought about. This may also narrow the space between the lower bumper reinforcement and the front bumper reinforcement, and it may become difficult to dispose the grille shutter 14 in this space. In the technology according to the present specification, a pair of specific members 13 are disposed in partial sections of the lower bumper reinforcement 12 along the extending direction of the lower bumper reinforcement 12. This enables increasing the pressure receiving area while suppressing increase in mass. This also enables space for disposing the grille shutter 14 to be secured.

Although a specific example of the technology disclosed in the present specification is described in detail above, this is merely exemplary and is not intended to limit the scope of claims. The technology described in the claims includes various modifications and alterations of the specific example exemplified above. The technical elements described in the present specification or illustrated in the drawings exhibit technical utility solely or in various combinations, and are not limited to the combinations described in the claims when filing. The technology exemplified in the present specification or in the drawings may achieve a plurality of objects at the same time, and has technical utility in itself by achieving one of the objects.

Modification

The positions of the specific members 13 in the vehicle width direction are not limited to the positions described in the present specification, and various positions may be employed. For example, in FIGS. 3 and 4, the end face 13e1 of the first portion 13a that is at the outer side in the vehicle width direction may be located outward in the vehicle width direction (i.e., on the left side in FIGS. 3 and 4) with respect to the outer-side sidewall 11o of the crash box 11. Thus, the first portion 13a can be made to overlap with both the inner-side sidewall 11i and the outer-side sidewall 11o of the crash box 11, as viewed from the front of the vehicle. Accordingly, the impact load can be efficiently conveyed to the inner-side sidewall 11i and the outer-side sidewall 11o.

Various structures may be employed as the structure of the protrusion 13c. For example, the protrusion 13c may be made of a component separate from the specific member 13, and may be attached to the specific member 13 by welding or the like.

The method of fixing the specific member 13 to the lower bumper reinforcement 12 is not limited to arc welding, and various fixing methods may be employed. For example, a fastening member such as a bolt may be used.

The number of the specific members 13 is not limited in particular. One, or three or more specific members 13 may be attached to the lower bumper reinforcement 12.

The specific shapes and structures of the specific member 13 and the lower bumper reinforcement 12 are not limited in particular. Also, the shape of the specific member 13 is not limited to the plate shape in this embodiment, and may be a tubular shape having a closed cross section.

The vehicle structure according to the present embodiment is not limited to a vehicle using an engine as a prime mover, and can be suitably adopted to an electrified vehicle that has an electric motor for driving wheels. The term "electrified vehicle" here includes, for example, a rechargeable battery electric vehicle charged by an external power source, a fuel cell electric vehicle that uses a fuel cell as a power source, a hybrid electric vehicle that also has an engine, and so forth.

The bolt 30 is an example of a fixing member.

What is claimed is:
1. A vehicle, comprising:
   a body;
   a front bumper reinforcement that is attached to a front end of the body, and extends along a vehicle width direction;

a lower bumper reinforcement that is attached to the front end of the body, is located under the front bumper reinforcement, and extends along the vehicle width direction;

at least one specific member that is fixed to a partial section of the lower bumper reinforcement along an extending direction of the lower bumper reinforcement;

a pair of crash boxes extending along a vehicle front-rear direction; and fixing members that fix the lower bumper reinforcement to the pair of crash boxes, wherein each of the at least one specific member includes a first portion that covers a front face of the lower bumper reinforcement, and a second portion that protrudes more upward than an upper face of the lower bumper reinforcement, rear end portions of the pair of crash boxes are connected to a lower portion of the body, front end portions of the pair of crash boxes are connected to the lower bumper reinforcement, at least a part of the first portion overlaps the front end portion of a corresponding one of the pair of crash boxes, as viewed from a front of the vehicle, the first portion is located inward in the vehicle width direction with respect to an outer-side sidewall at an outer side of the corresponding one of the pair of crash boxes in the vehicle width direction, as viewed from the front of the vehicle, a part of the first portion is located inward in the vehicle width direction with respect to an inner-side sidewall at an inner side of the corresponding one of the pair of crash boxes in the vehicle width direction, as viewed from the front of the vehicle, and each of the fixing members is located inward in the vehicle width direction with respect to the outer-side sidewall of the corresponding one of the pair of crash boxes, and outward in the vehicle width direction with respect to an end face at an outer side of the first portion in the vehicle width direction, as viewed from the front of the vehicle.

2. The vehicle according to claim 1, wherein a length of each of the at least one specific member in an up-down direction is greater than a length of the lower bumper reinforcement in the up-down direction.

3. The vehicle according to claim 1, wherein each of the at least one specific member further includes a protrusion that projects rearward from the second portion and that is in contact with the upper face of the lower bumper reinforcement.

4. The vehicle according to claim 1, wherein
the body includes a subframe disposed at the lower portion of the body, and
the pair of crash boxes is connected to a front end portion of the subframe.

5. The vehicle according to claim 1, further comprising a grille shutter disposed above the lower bumper reinforcement, wherein the grille shutter is located inward in the vehicle width direction with respect to an end face at an inner side of the second portion in the vehicle width direction, as viewed from the front of the vehicle.

6. The vehicle according to claim 1, wherein a strength of a material of the at least one specific member is weaker than a strength of a material of the lower bumper reinforcement.

7. The vehicle according to claim 1, wherein the at least one specific member and the front face of the lower bumper reinforcement are spaced from each other.

* * * * *